April 26, 1966  L. E. PENNINGTON  3,248,134
REINFORCED WELDED JOINT
Filed Feb. 25, 1963
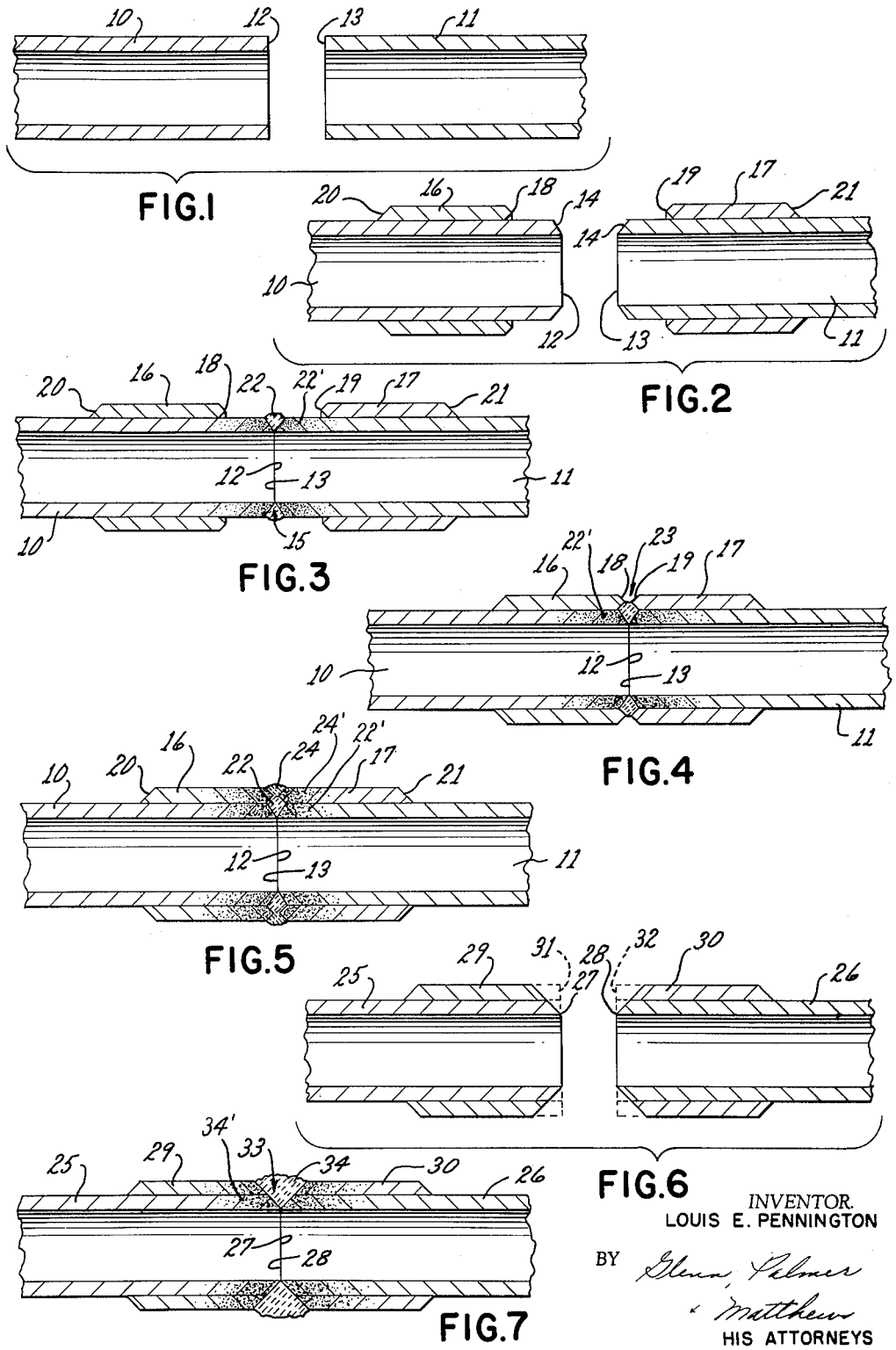
INVENTOR.
LOUIS E. PENNINGTON
BY *Glenn, Palmer*
*& Matthew*
HIS ATTORNEYS United States Patent Office 3,248,134
Patented Apr. 26, 1966

3,248,134
REINFORCED WELDED JOINT
Louis E. Pennington, Chesterfield County, Va., assignor to Reynolds Metals Company, Richmond, Va., a corporation of Delaware
Filed Feb. 25, 1963, Ser. No. 260,524
1 Claim. (Cl. 285—286)

This invention relates to improved coupling means for tubular members, such as metallic pipes or the like, as well as to an improved method of coupling such members or the like.

It is well known that when a pair of tubular metallic members are to be coupled together in aligned relation at adjacent ends therof by welding or the like, certain metals suffer from partial loss of mechanical properties immediately adjacent to the resultant fusion weld because of the partial annealing effect of the welding heat on the metal adjacent to the weld area. For example, such loss of mechanical properties is particularly noticeable in most aluminum alloys and the like. This loss in mechanical properties, which, in some instances, may be as great as 50%, usually governs the designs of pipe lines, tubular pressure systems and pressure cylinders in that the wall thicknesses of the cylindrical bodies must be designed around the reduced strength of that resultant local partially-annealed zone.

To overcome the above disadvantages, heavy ended pipes and the like have been provided wherein each pipe has the ends thereof provided with increased thicknesses of metal. Therefore, the circumferential butt welds of aligned heavy ended pipe are made in heavy metal zones wherein the additional thickness of metal compensates for the partial annealing of the adjacent material and permits that thicker material to work at the same internal pressures as the thinner, unaffected major body of the pipe.

However, such heavy ended pipe has its disadvantages. The couplings cannot be made at any desired location along a length of pipe because the thicker metal is only disposed at the ends thereof and should it be desired to have a half length pipe coupled to another pipe, uniform-walled pipe of the heavy end thickness must be used, resulting in metal wastage.

However, according to the teachings of this invention, an approved coupling and method are provided wherein the above annealing effect is compensated for and the pipes or tubular members being coupled together need not be of standard lengths and the like.

In particular, a mathematical analysis of the pipe stress relationships in pipes, tubes and pressure cylinders indicates that the partial annealing of circumferential but welded zones is detrimental to the cylindrical body only with respect to the hoop tension induced by the internal working pressure of the cylinder. It is mathematically demonstratable that, in any such cylindrical body, the longitudinal tension induced by the internal pressure in a a free body cylinder is always less than one-half of the loop tension stress. Therefore, any cylinder, which in its unwelded zones, has adequate hoop strength for its service presure will, in its circumferentially welded zones, have even greater safety factor against longitudinal tension if its welded zone efficiency is at least 50%. This being the case, in order to reinforce the heat infected zone against hoop tension stresses, it is only necessary to apply another tubular member or cuff of cylindrical configuration immediately and intimately over the outside circumference of the parent cylinder body, the second or outside tubular member or sleeve having a wall thickness approximately equal to that of the parent cylindrical body. Accordingly, an improved coupling for tubular members or the like is provided in a manner hereinafter described.

Therefore, it is an object of this invention to provide an improved coupling for tubular members or the like, the coupling having one or more of the novel features set forth above or hereinafter shown or described.

Another object of this invention is to provide an improved method for coupling such tubular members or the like.

Other objects, uses and advantages of this invention are apparent from a reading of this description which proceeds with reference to the accompanying drawings forming a part thereof and wherein:

FIGURE 1 is a fragmentary cross-sectional view illustrating two tubular members or pipes to be coupled together at adjacent ends thereof by the teachings of this invention.

FIGURE 2 is a view similar to FIGURE 1 and illustrates one of the steps of the method of this invention.

FIGURE 3 is a view similar to FIGURE 2 and illustrates still another step of this invention.

FIGURE 4 is a view similar to FIGURE 3 and illustrates still another step of this invention.

FIGURE 5 is a view similar to FIGURE 4 and illustrates the completed coupling structure of this invention.

FIGURE 6 is a view similar to FIGURE 1 and illustrates another embodiment of this invention.

FIGURE 7 is a view similar to FIGURE 6 and illustrates the completed coupling construction of FIGURE 6.

While the various features of this invention are hereinafter described and illustrated as being particularly adaptable for securing together metal tubular members or the like, it is to be understood that the various features of this invention can be utilized singly or in combination to couple together other members as desired.

Therefore, this invention is not to be limited to only the embodiments illustrated in the drawings, because the drawings are merely utilized to illustrate one of the wide variety of uses of this invention.

Referring now to FIGURE 1, a first pair of metallic tubular members or pipes 10 and 11 respectively have ends 12 and 13 which are to be coupled to each other in aligned relation according to the teachings of this invention, the tubular members 10 and 11 comprising aluminum-containing metallic material or the like which is adapted to suffer from partial loss of mechanical properties immediately adjacent the ends 12 and 13 when the same are welded together.

As illustrated in FIGURE 2, the ends 12 and 13 of the tubular members 10 and 11 are beveled at 14 to define an outwardly facing annular channel 15 therebetween, FIGURE 3, when the ends 12 and 13 are brought together.

Before the ends 12 and 13 of the tubular members 10 and 11 are brought together, a second pair of tubular members or cuffs 16 and 17 are respectively telescoped over the first pair of tubular members 10 and 11 in the manner illustrated in FIGURE 2 and are moved outwardly from ends 12 and 13 thereof, the tubular members 16 and 17 having adjacent ends 18 and 19 formed in substantially chisel shapes.

The other ends 20 and 21 of the tubular members 16 and 17 can be beveled as illustrated or can remain straight as desired.

After the tubular members or cuffs 16 and 17 have been disposed in encompassing relation over the first pair of tubular members 10 and 11 in the manner illustrated in FIGURE 2, the tubular members 10 and 11 have the adjacent ends 12 and 13 brought together in the manner illustrated in FIGURE 3 whereby the channel 15 defined therebetween has a substantially V-shaped cross-sectional configuration.

Subsequently, welding means 22 is disposed in the channel 15 defined between the tubular members 10 and 11 to weld the adjacent ends 12 and 13 thereof together, the welding means 22 forming a root bead weld or the like having the outer surface thereof disposed slightly outboard of the external surfaces of the tubular members 10 and 11.

However, the heat of formation of the welding means 22 anneals the ends 12 and 13 of the tubular members 10 and 11 in the manner illustrated by the shading 22' in FIGURE 3, the adverse heat-affected zones 22' diminishing outwardly from the ends 12 and 13 and being compensated for in a manner now to be described.

Subsequently, the second pair of tubular members or cuffs 16 and 17 are brought toward each other whereby the chisel-shaped ends 18 and 19 thereof are disposed partially over the root bead weld 22 in the manner illustrated in FIGURE 4 whereby the ends 18 and 19 of the tubular members 16 and 17 define a second outwardly facing channel 23 as illustrated in FIGURE 4.

With the tubular members 16 and 17 disposed in the position illustrated in FIGURE 4, a second welding means 24 is disposed in the channel 23 to form a cover weld beam which not only welds the ends 18 and 19 of the tubular members 16 and 17 to each other but also welds the ends 18 and 19 of the tubular members 16 and 17 to the welding means 22 so that all of the ends 12, 13, 18 and 19 of the tubular members 10, 11, 16 and 17 are welded together to form the unique coupling structure of this invention which readily permits the coupled pipes 10 and 11 to withstand internal pressures equal to the internal pressures remote from the welded zone of the tubular members 10 and 11 because of the reinforcing provided by the tubular members or cuffs 16 and 17 even though the cuffs 16 and 17 have resultant heat-affected zones 24' as illustrated in FIGURE 5.

Therefore, it can be seen that this invention provides an improved coupling means for metallic tubular members or the like as well as an improved method for coupling such tubular members or the like.

Another coupling construction and method of this invention is illustrated in FIGURES 6 and 7 wherein a first pair of tubular members or pipes 25 and 26 are adapted to have ends 27 and 28 coupled to each other in aligned relation.

Initially, the ends 27 and 28 of the tubular members 25 and 26 are substantially straight as indicated by the downward lines in FIGURE 6.

A second pair of metallic tubular members or cuffs 29 and 30 are disposed in telescoping relation over the tubular members 25 and 26 wherein the adjacent ends 31 and 32 of the tubular members 29 and 30 are substantially straight as indicated by dotted lines in FIGURE 6 and are disposed flush with the straight ends 27 and 28 of the telescoped tubular members 25 and 26.

With the tubular members 25, 26, 29 and 30 disposed in the position illustrated in FIGURE 6, intimate contact is subsequently provided between the tubular members 25, 29 and 26 and 30 in any suitable manner.

For example, the outer tubular members 29 and 30 can be swedged, drawn-sunk or crushed onto the inner tubular members 25 and 26 or the same can be press-fitted thereon or can be applied loosely over the ends of the inner tubular members 25 and 26 and the inner tubular members 25 and 26 subsequently expanded from the inside to cause intimate contact with the respective reinforcing cuffs 29 and 30.

In any event, intimate contact is effected between the outer tubular members 29 and 30 and the inner tubular members 25 and 26.

Subsequently, the ends 27, 31 and 28, 32 are simultaneously beveled as indicated by solid lines in FIGURE 6 whereby when the assembled tubular members 25, 26, 29 and 30 are brought together in the manner illustrated in FIGURE 7, an outwardly facing annular channel 33 is defined therebetween, the annular channel 33 having a substantially V-shaped cross-sectional configuration.

Subsequently, welding means 34 is disposed in the channel 33 in the manner illustrated in FIGURE 7 to weld all of the ends 27, 28, 31 and 32 of the tubular members 25, 26, 29 and 30 together to provide the improved coupling of this invention.

Therefore, the reinforcing cuffs or tubular members 29 and 30 permit the assembled tubular members 25 and 26 to support an internal pressure throughout its length equal to the maximum internal pressure that can be supported in the unannealed zone of the tubular members 25 and 26 for the purpose previously described even though the cuffs 29 and 30 and tubular members 25 and 26 have resultant heat-affected zones 34' as illustrated by shading in FIGURE 7.

Thus, it can be seen that another improved coupling and method of making the same is provided by FIGURES 6 and 7 of this invention.

While the outer tubular members of this invention can have any suitable thickness and any suitable lengths, it has been found that the heat resulting from the fusion welding operation will seldom extend beyond a band parallel to the weld bead no more than about sixteen wall thicknesses therefrom. Therefore, the reinforcing cuff or tubular member need be only about twenty-five wall thicknesses in length, the wall thickness being referred to being that of the inner tubular member.

While the form of the invention now preferred has been disclosed as required by the statutes, other forms may be used, all coming within the scope of the claims which follow.

What is claimed is:

In combination, a first pair of metal tubular members respectively having ends disposed adjacent each other and defining a first channel therebetween, said ends of said first pair of tubular members being beveled whereby said first channel has a V-shaped cross-sectional configuration, a root bead weld means disposed in said first channel and securing said ends of said first pair of tubular members together, a second pair of metal tubular members respectively and closely encompassing said first pair of tubular members and respectively having ends disposed adjacent each other and defining a second channel, said ends of said second pair of tubular members being chisel-shaped whereby portions thereof are disposed over said root bead weld means, and a cover bead weld means disposed in said second channel to secure said ends of said second pair of tubular members together as well as to said root bead weld means whereby said second tubular members reinforce said first tubular members at the welded ends thereof.

References Cited by the Examiner

UNITED STATES PATENTS

| 649,473 | 5/1900 | Palmer | 285—286 X |
|---|---|---|---|
| 1,515,355 | 11/1924 | Mitchell | 285—286 |
| 1,679,499 | 8/1928 | Rupley | 285—286 X |
| 1,835,236 | 12/1931 | Miller | 285—416 |
| 2,037,962 | 4/1936 | Brown | 285—22 |
| 2,062,886 | 12/1936 | Jensen | 29—470.7 |
| 2,308,307 | 1/1943 | Robinson | 285—286 X |
| 2,391,747 | 12/1945 | Schoessow | 285—286 X |
| 2,623,148 | 7/1951 | Ronay | 285—21 X |
| 2,711,912 | 6/1955 | Boice | 285—286 |

FOREIGN PATENTS

| 287,005 | 3/1928 | Great Britain. |
|---|---|---|
| 496,293 | 11/1938 | Great Britain. |

CARL W. TOMLIN, *Primary Examiner.*